United States Patent
Sachtleben et al.

(10) Patent No.: US 12,345,664 B2
(45) Date of Patent: Jul. 1, 2025

(54) X-RAY IDENTIFICATION OF CONNECTIONS IN A TUBULAR STRING

(71) Applicant: WEATHERFORD TECHNOLOGY HOLDINGS, LLC, Houston, TX (US)

(72) Inventors: Benjamin Sachtleben, Hannover (DE); David Geissler, Hannover (DE); Rainer Ruehmann, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 225 days.

(21) Appl. No.: 18/065,966

(22) Filed: Dec. 14, 2022

(65) Prior Publication Data
US 2024/0201108 A1    Jun. 20, 2024

(51) Int. Cl.
G01N 23/04    (2018.01)
G01N 23/083    (2018.01)

(52) U.S. Cl.
CPC .......... G01N 23/04 (2013.01); G01N 23/083 (2013.01); *G01N 2223/1016* (2013.01); *G01N 2223/308* (2013.01); *G01N 2223/628* (2013.01); *G01N 2223/629* (2013.01)

(58) Field of Classification Search
CPC ............. G01N 23/04; G01N 23/083; G01N 2223/1016; G01N 2223/308; G01N 2223/628; G01N 2223/629; E21B 19/165; E21B 44/00
See application file for complete search history.

(56) References Cited

U.S. PATENT DOCUMENTS

| | | | |
|---|---|---|---|
| 10,760,403 B2 | 9/2020 | Ellis et al. | |
| 10,975,681 B2 | 4/2021 | Ruehmann et al. | |
| 10,995,571 B2 | 5/2021 | Zheng et al. | |
| 11,131,540 B2 | 9/2021 | Orban et al. | |
| 11,280,177 B2 | 3/2022 | Goodneratne et al. | |
| 2016/0342916 A1 | 11/2016 | Arceneaux et al. | |
| 2020/0157893 A1 | 5/2020 | Jorud | |
| 2020/0190963 A1 | 6/2020 | Gooneratne et al. | |
| 2020/0190967 A1 | 6/2020 | Gooneratne et al. | |
| 2021/0164303 A1* | 6/2021 | Valen | E21B 19/14 |
| 2021/0355765 A1 | 11/2021 | Ruehmann et al. | |
| 2022/0326165 A1* | 10/2022 | Liang | G01N 23/083 |
| 2023/0079368 A1* | 3/2023 | Ruehmann | E21B 17/042 382/141 |
| 2024/0102944 A1* | 3/2024 | Liang | G01N 23/04 |

FOREIGN PATENT DOCUMENTS

| | | | |
|---|---|---|---|
| CN | 113953461 A | * | 1/2022 |
| WO | 2013/106850 A1 | | 7/2013 |

OTHER PUBLICATIONS

International Search Report with Written Opinion issued Feb. 8, 2024 for PCT/IB2023/061451, 9 pages.

* cited by examiner

*Primary Examiner* — David P Porta
*Assistant Examiner* — Casey Bryant
(74) *Attorney, Agent, or Firm* — Smith IP Services, P.C.

(57) ABSTRACT

A method for use with a subterranean well can include positioning an x-ray unit so that x-rays emitted by the x-ray unit scan a tubular string, displacing the tubular string relative to the x-ray unit, and identifying a threaded connection in the tubular string. A system can include a torque application device configured to apply torque to a threaded connection in a tubular string, and an x-ray unit configured to project x-rays toward the tubular string.

20 Claims, 4 Drawing Sheets

X-RAY IDENTIFICATION OF CONNECTIONS IN A TUBULAR STRING

BACKGROUND

This disclosure relates generally to equipment utilized and operations performed in conjunction with a subterranean well and, in an example described below, more particularly provides for identifying a threaded connection in a tubular string using an x-ray unit.

When running a tubular string into or out of a well, threaded connections between segments of the tubular string need to be made-up or broken-out. In order to break-out a threaded connection, a location of the threaded connection must be known.

Therefore, it will be readily appreciated that advancements are continually needed in the art of handling tubulars used in subterranean wells. The present specification provides such advancements, which may be used in a process of breaking-out threaded connections, or for other purposes.

DETAILED DESCRIPTION

Figure 1:
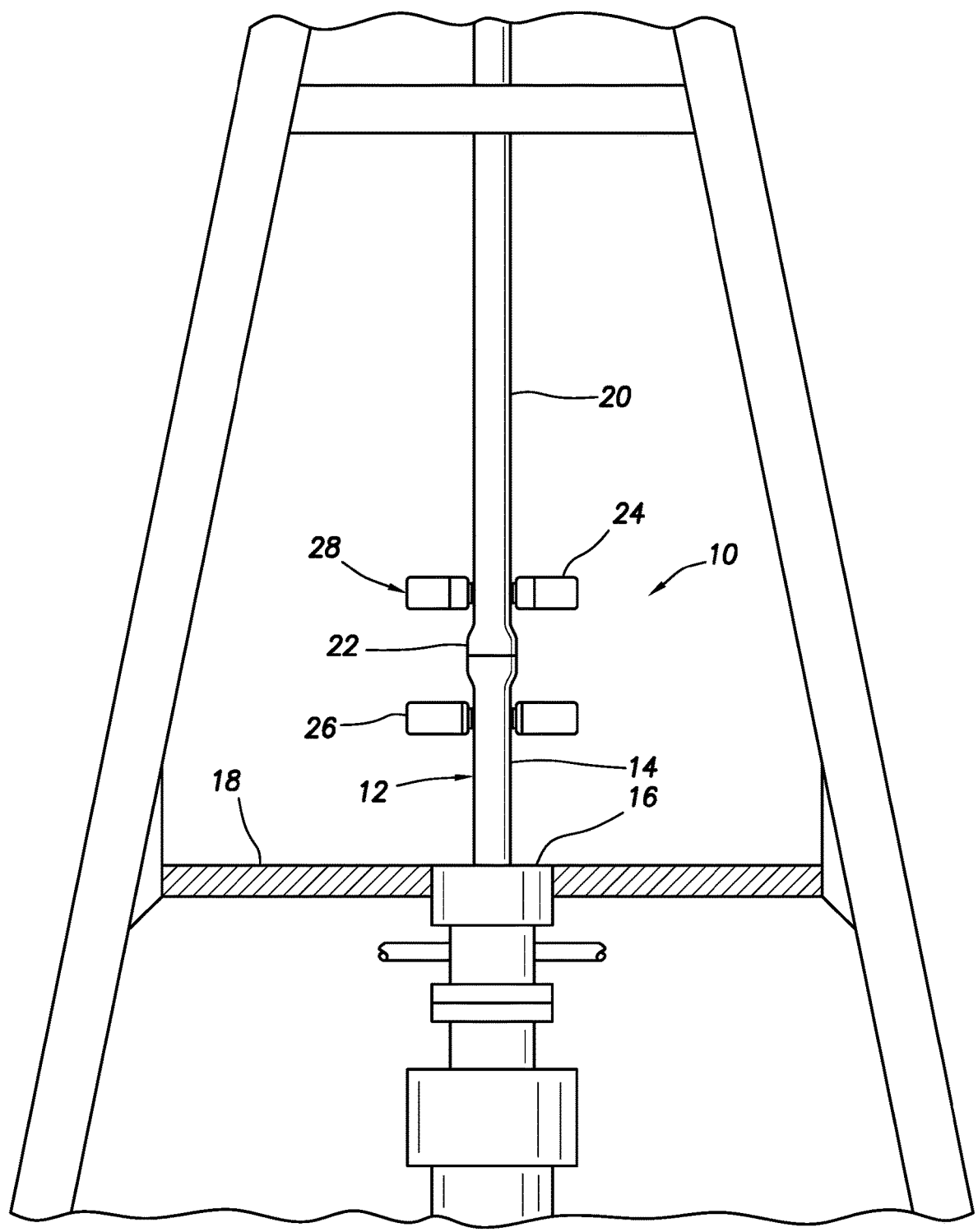
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is being retrieved from a well. The tubular string 12 in this example is a drill string, but in other examples the tubular string could be a casing, liner, completion, stimulation, testing, production or injection tubing, or other type of tubular string. The scope of this disclosure is not limited to use of any particular type of tubular string, or to any particular threaded components connected in a tubular string.

As depicted in FIG. 1, a tubular 14 is suspended near its upper end by means of a rotary table 16, which may comprise a pipe handling spider and/or safety slips to grip the tubular 14 and support a weight of the tubular string 12. In this manner, the upper end of the tubular 14 extends upwardly through a rig floor 18 in preparation for disconnecting another tubular 20 from the tubular string 12.

In this example, a threaded connection 22 is formed by a lower externally threaded end of the upper tubular 20 threaded into an upper internally threaded end of the lower tubular 14. In other examples, a separate internally threaded coupling could be used to connect externally threaded ends of the tubulars 14, 20.

As depicted in FIG. 1, the threaded together ends of the tubulars 14, 20 are externally "upset," in that an outer diameter at the threaded connection 22 is larger than an outer diameter of the tubulars between their ends. In other examples, the threaded together ends of the tubulars 14, 20 may be "flush," instead of "upset," so that the outer diameter at the threaded connection 22 is the same as the outer diameter of the tubulars between their ends.

The principles of this disclosure can be particularly useful when the ends of the tubulars 14, 20 are flush, because this can make the threaded connection 22 difficult to perceive visually (especially when the connection is obscured by mud, pipe dope, etc.). However, the scope of this disclosure is not limited to use of any particular type of connection between tubulars.

In conventional well operations, it is common for a single tubular (or a threaded together tubular and coupling) to be referred to as a "joint" and for threaded together joints to be referred to as a "stand" of tubing, casing, liner, pipe, etc. Where a separate coupling is not used (as in the FIG. 1 example), one end (typically an upper "box" end of a joint) is internally threaded and the other end (typically a lower "pin" end of the joint) is externally threaded, so that successive joints can be threaded directly to each other.

To break-out the threaded connection 22 between the tubular 20 and the tubular 14, a set of tongs or rotary and backup clamps 24, 26 are used. The rotary clamp 24 in the FIG. 1 example is used to grip, rotate and apply torque to the upper tubular 20 as it is unthreaded from the lower tubular 14.

The backup clamp 26 in the FIG. 1 example is used to grip and secure the lower tubular 14 against rotation, and to react the torque applied by the rotary clamp 24. The rotary clamp 24 and the backup clamp 26 may be separate devices, or they may be components of a rig apparatus known to those skilled in the art as an "iron roughneck."

In one example, the rotary clamp 24 and backup clamp 26 may be components of a torque application device 28, such as a tong system or an iron roughneck. In this example, the rotary clamp 24 may be a mechanism that rotates and applies torque to the upper tubular 20, and the backup clamp 26 may be a backup mechanism that reacts the applied torque and prevents rotation of the lower tubular 14. Thus, the term "rotary clamp" as used herein indicates the rotation and torque application mechanism, and the term "backup clamp" as used herein indicates the torque reacting mechanism.

In the FIG. 1 method, it is desirable for the threaded connection 22 to be positioned vertically between the rotary clamp 24 and the backup clamp 26. If the height of the threaded connection 22 above the rig floor 18 (known as "stick-up" height) can be determined, then the rotary and backup clamps 24, 26 can be appropriately positioned (such as, by adjusting their vertical heights), so that the threaded connection is vertically between the rotary and backup clamps. Alternatively, or in addition, a lifting apparatus (such as, an elevator, a crane, a hoist, etc.) used to lift the tubular string 12 can be operated to appropriately adjust the vertical height of the threaded connection 22, so that it is vertically between the rotary and backup clamps 24, 26.

Figure 2:
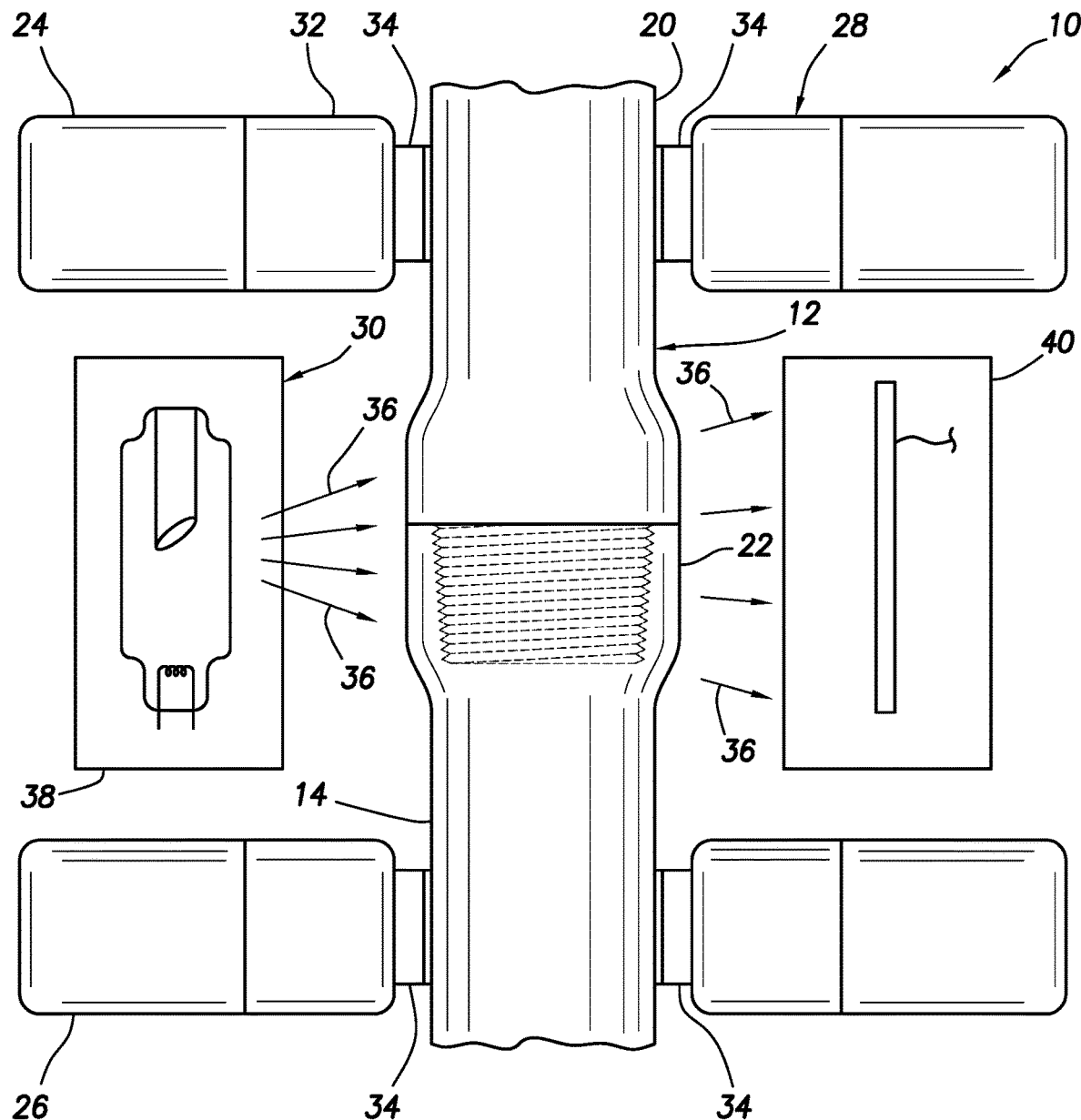
FIG. 2 is a representative side view of an example of a tubular string being scanned with an x-ray unit.

Referring additionally now to FIG. 2, a portion of the FIG. 1 system 10, depicting an example of a threaded connection being broken-out or disconnected, is representatively illustrated. For convenience, various examples of the method of breaking-out a threaded connection are described below as they may be used with the system 10 of FIG. 1, but the methods may be used with other systems in keeping with the principles of this disclosure.

As depicted in FIG. 2, the threaded connection break-out process is ready to be performed. The tubular 20 is appropriately positioned in the rotary clamp 24, so that the rotary clamp can grip an outer surface of the tubular 20. The backup clamp 26 grips an outer surface of the tubular 14 to react torque applied during the threaded connection break-out process.

The upper tubular 20 can be rotated by a rotor 32 of the rotary clamp 24. The rotor 32 is rotated by a motor (not shown) of the rotary clamp 24. Jaws 34 carried in the rotor 32 grip the outer surface of the upper tubular 20, thereby transmitting torque and rotation from the rotor to the upper tubular as it is unthreaded from the lower tubular 14. The backup clamp 26 also includes jaws 34 that grip the outer surface of the lower tubular 14 to react the torque applied by the rotary clamp 24 and thereby prevent rotation of the lower tubular.

An x-ray unit 30 is positioned between the rotary and backup clamps 24, 26, so that x-rays 36 emitted by an emitter 38 of the x-ray unit can pass through, onto or about the tubular string 12. As depicted in FIG. 2, the x-rays 36 are passing through the threaded connection 22 and to an x-ray detector 40 of the x-ray unit 30.

The x-ray unit 30 can be used to identify the threaded connection 22, due to differences between the threaded connection and the remainder of the tubulars 14, 20. As described more fully below, an image processor can be used to identify the threaded connection 22 as it passes upwardly through the x-ray unit 30 when the tubular string 12 is being retrieved from the well.

Note that it is not necessary for the x-ray unit 30 to be positioned between the rotary and backup clamps 24, 26. In other examples, the x-ray unit 30 could be positioned below the backup clamp 26 (such as, between the backup clamp and the rig floor 18). The scope of this disclosure is not limited to any particular position of the x-ray unit 30 relative to the torque application device 28 or any component thereof.

In one example of the method, the x-ray unit 30 continuously scans the tubular string 12 (projects the x-rays 36 through, onto or about the tubular string) as it is being raised out of the well. If the x-rays 36 are projected through the threaded connection 22, internal details of the threaded connection (such as the threads) can be detected. If the x-rays 36 are lower energy and pass about or are reflected off of an outer surface of the threaded connection 22, a contour or other surface structure of the threaded connection may be identified.

When the threaded connection 22 is identified, the raising of the tubular string 12 is ceased, so that the threaded connection is then at a known position (such as, a known vertical height above the rig floor 18, or a known vertical distance from the rotary and backup clamps 24, 26). The ceasing of the tubular string 12 upward displacement can be performed manually (such as, by an operator in response to a visual and/or audible signal), or it can be performed automatically (such as, by a control system in response to an appropriate signal from an image processor connected to the detector 40).

If the x-ray unit 30 is not positioned between the rotary and backup clamps 24, 26, it may be desirable to displace the tubular string 12 a certain vertical distance after the threaded connection 22 is identified, so that the threaded connection is then in a convenient position to be broken-out using the torque application device 28. For example, if the x-ray unit 30 is positioned on or just above the rig floor 18, the threaded connection 22 might be identified while it is still at a position that is too low for the torque application device 28 to effectively break-out the connection. In that case it might be desirable to raise the tubular string 12 an appropriate distance to enable the jaws 34 to conveniently grip the outer surfaces of the tubulars 14, 20 below and above the threaded connection 22.

With the threaded connection 22 at a known position, the torque application device 28 can be raised or lowered if needed, so that the threaded connection is vertically between the rotary and backup clamps 24, 26. The jaws 34 can then be actuated to grip the outer surfaces of the tubulars 14, 20, and the rotor 32 can be activated to unthread the upper tubular 20 from the lower tubular 14.

Figure 3:
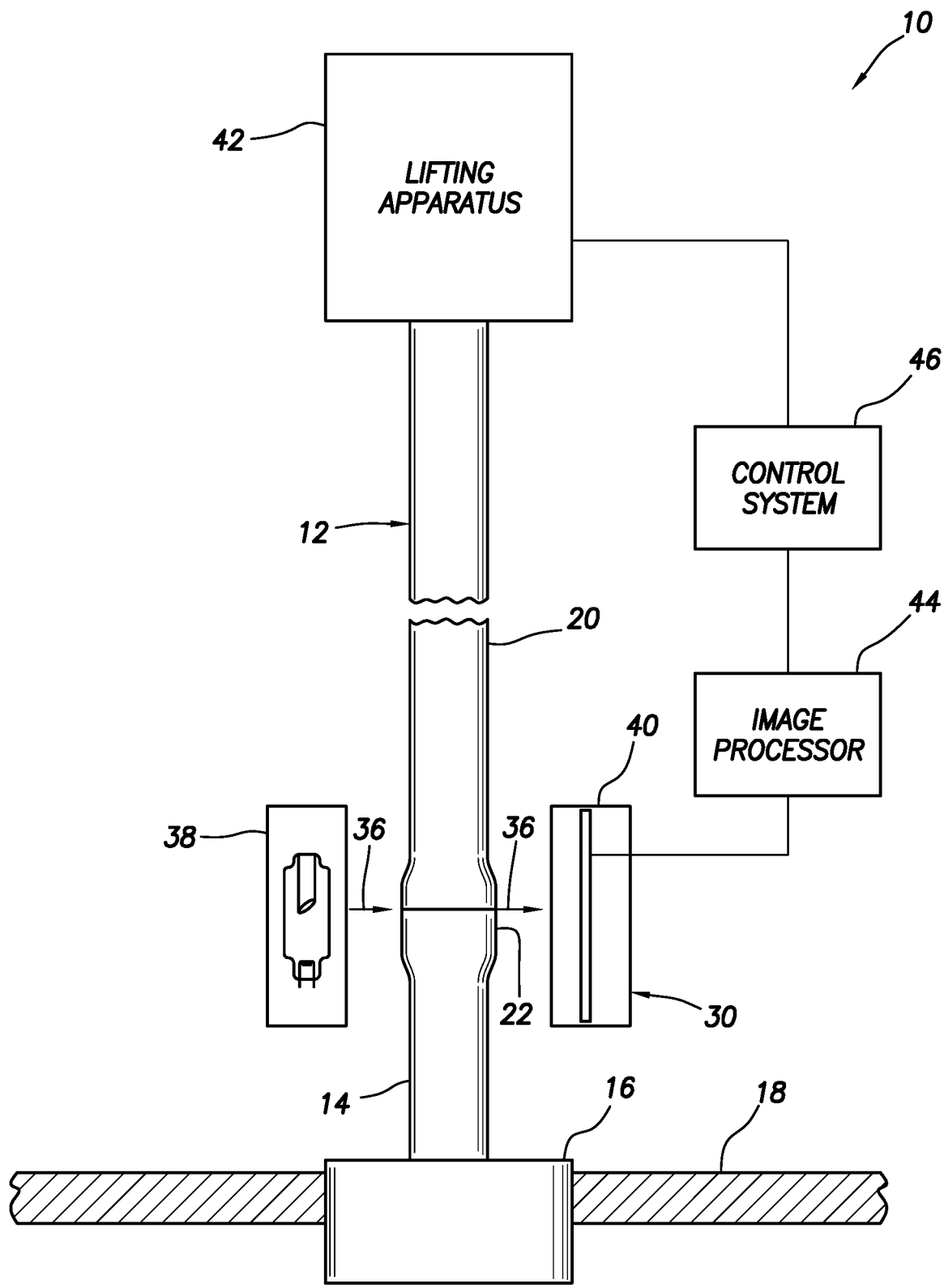
FIG. 3 is a representative side view of another example of the tubular string being scanned with the x-ray unit.

Referring additionally now to FIG. 3, another example of the system 10 is representatively illustrated. The FIG. 3 system 10 is similar to the FIG. 2 system, in that the x-ray unit 30 is positioned about the tubular string 12, so that the tubular string will be exposed to the x-rays 36 emitted from the emitter 38, and the x-rays will be detected by the detector 40.

The torque application device 28 is not depicted in FIG. 3. However, the torque application device 28 (such as, tongs, an iron roughneck, a top drive, etc.) can be at any appropriate position relative to the x-ray unit 30 in the FIG. 3 system 10. For example, the x-ray unit 30 may be positioned below the torque application device 28 (such as, between the torque application device and the rig floor 18 in the FIG. 1 system 10), or the x-ray unit may be positioned between rotary and backup clamps 24, 26 of the torque application device.

In one example of the method using the FIG. 3 system 10, a lifting apparatus 42 is used to lift the tubular string 12 as it is being retrieved from the well. The lifting apparatus 42 may comprise an elevator, a crane, a hoist, a top drive or any other apparatus capable of raising the tubular string 12 out of the well.

As the tubular string 12 is being displaced upward by the lifting apparatus 42, the emitter 38 emits the x-rays 36 toward the tubular string. The x-rays 36 pass through the tubular string 12, are reflected off of the tubular string or pass around an outer surface of the tubular string, and are detected by the detector 40.

The detector 40 is connected to an image processor 44. The image processor 44 receives signals from the detector 40 indicative of a configuration and/or material of an area of the tubular string 12 scanned by the x-rays 36. The image processor 44 is programmed or trained to identify when the area of the tubular string 12 scanned by the x-rays 36 comprises a threaded connection.

For example, the image processor 44 could include a neural network or other form of artificial intelligence that is trained to detect when the signals received from the detector 40 indicate the presence of a threaded connection in the x-ray unit 30. Alternatively, the image processor 44 could be programmed to recognize a change in the quantity or amplitude of the x-rays 36 that scan the tubular string 12 as being indicative of a threaded connection.

When the threaded connection 22 is identified using the image processor 44, the position of the threaded connection will also be known, since the threaded connection will be in the x-ray unit 30, whose position is known.

A control system 46 connected to the image processor 44 receives an indication from the image processor 44 that the threaded connection 22 has been identified. The control system 46 controls operation of the lifting apparatus 42, so that the threaded connection 22 is then raised or lowered as appropriate to align the threaded connection with a torque application device (such as, the FIG. 2 torque application device 28). In some examples, the image processor 44 may be included as part of the control system 46.

In one example, the control system 46 can control operation of the lifting apparatus 42, so that the threaded connection 22 is automatically positioned between the rotary and backup clamps 24, 26 of the torque application device 28 when the control system receives the indication from the image processor 44 that the threaded connection is identified. The upper tubular 20 can then be unthreaded from the lower tubular 14 as described above.

The control system 46 may include a controller (such as, a programmable logic controller suitable for controlling operation of the lifting apparatus 42 and/or the torque application device 28), memory, and input and output devices. The control system 46 may be in communication with a remote location via wired, wireless, Internet or satellite communication.

The FIG. 3 image processor 44, control system 46 and/or lifting apparatus 42 may be used with the FIG. 2 system 10 and method in other examples. The control system 46 may control positioning of the torque application device 28 at a desired vertical height for applying torque to the threaded connection 22 after the threaded connection is identified using the x-ray unit 30 and the image processor 44. The scope of this disclosure is not limited to use of any particular configuration or combination of elements in the system 10.

Figure 4:
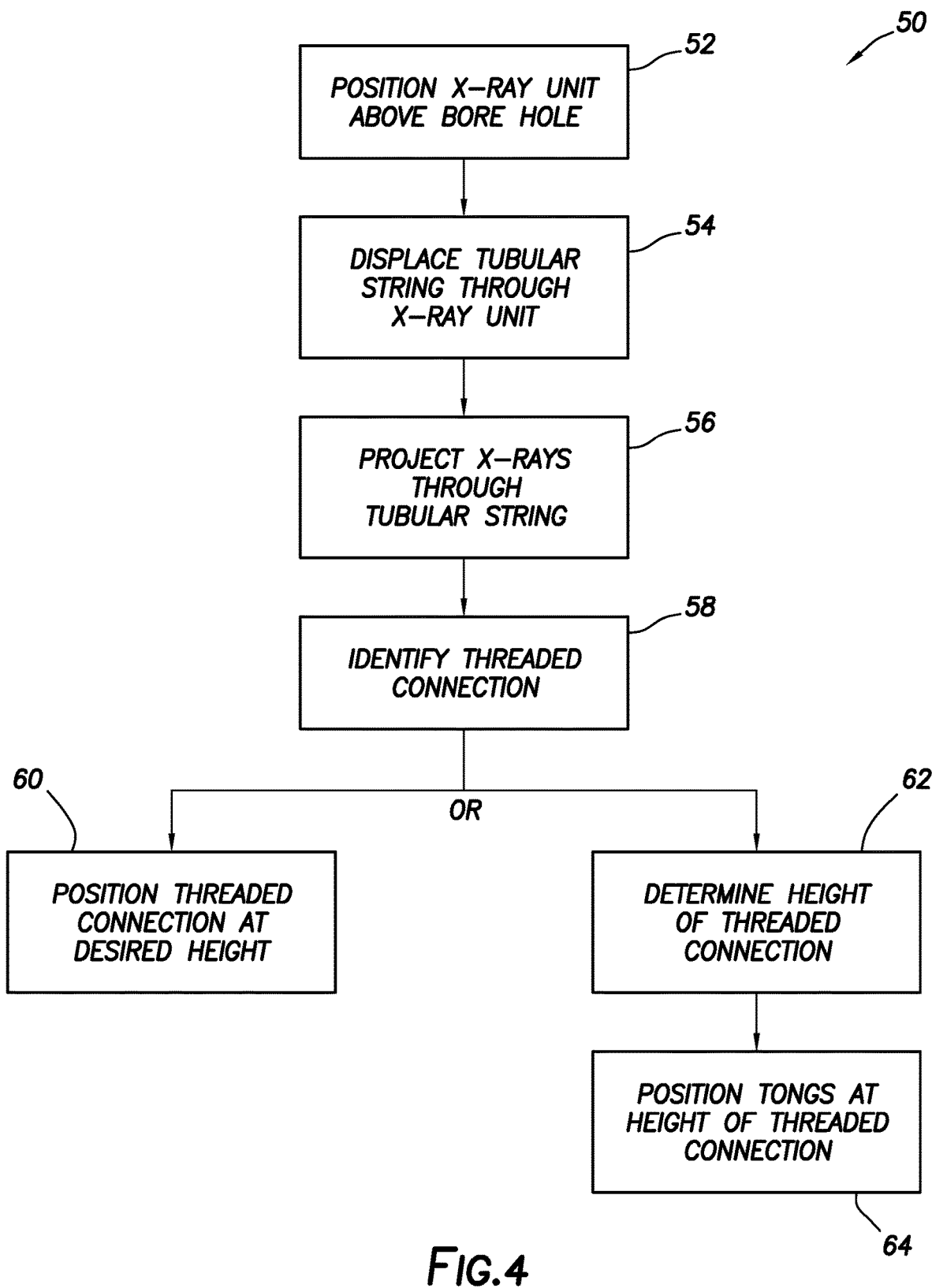
FIG. 4 is a representative flowchart for a method of identifying and determining a height of a threaded connection.

Referring additionally now to FIG. 4, an example of a method 50 incorporating the principles of this disclosure is representatively illustrated in flowchart form. The method 50 is described below as it may be used with the FIGS. 1-3 system 10 examples, but the method may be used with other systems in keeping with the scope of this disclosure.

In an initial step 52, the x-ray unit 30 is positioned above a bore hole. In the FIGS. 1-3 examples, the x-ray unit 30 is positioned above the rotary table 16, so that the emitter 38 and detector 40 are on opposite sides of the tubular string 12 (which extends downward into a bore hole of the well). The x-ray unit 30 can be positioned vertically above or below, or in, a torque application device 28 (such as, between rotary and backup clamps 24, 26).

In step 54, the tubular string 12 is displaced through or into the x-ray unit 30. The tubular string 12 may be displaced upward or downward at least partially through the x-ray unit 30. For example, vertical displacement of the tubular string 20 may be ceased as soon as the threaded connection 22 is identified (step 58) and while the threaded connection is still in the x-ray unit 30, or the threaded connection 22 may be displaced completely through the x-ray unit.

In step 56, the x-rays 36 scan the tubular string 12 as the tubular string is displaced through or into the x-ray unit 30. The x-ray detector 40 detects the x-rays 36 that pass through, are reflected off of, or pass about the tubular string 12. Signals indicative of the x-rays 36 that scan the tubular string 12 are transmitted to the image processor 44.

In step 58, a threaded connection 22 is identified. In the FIG. 3 example, the image processor 44 is programmed or trained to identify the threaded connection 22, based on the signals received from the x-ray detector 40. When the threaded connection 22 is identified, its vertical position is also known. The position may be relative to the rig floor 18, the rotary table 16 or the torque application device 28 (or any combination thereof).

In step 60, the threaded connection 22 is positioned at a desired height. In the FIG. 3 example, the lifting apparatus 42 can be used to raise or lower the threaded connection 22 as needed to displace the threaded connection to a desired position, for example, so that the torque application device 28 can conveniently apply torque to the threaded connection. The raising or lowering of the threaded connection 22 may be performed manually or automatically. With the threaded connection 22 at the desired position, the torque application device 28 can be used to unthread the threaded connection.

In step 62, the height of the threaded connection 22 is determined. This step 62 may be performed simultaneously with the step 58 of identifying the threaded connection 22. For example, the height of the threaded connection 22 when it is identified may be the same as a known height of the x-ray unit 30.

In step 64, tongs or another torque application device 28 is/are raised or lowered, so that the torque application device is at an appropriate height for applying torque to the threaded connection 22. The raising or lowering of the torque application device 28 may be performed manually or automatically. With the torque application device 28 at a desired height, the torque application device can be used to unthread the threaded connection 22.

Although the steps 62, 64 are depicted in FIG. 4 as being alternative to the step 60, in some examples all of the steps 60-64 may be performed. That is, both the height of the threaded connection 22 and the height of the torque application device 28 may be adjusted if needed to align the threaded connection with the torque application device, after the threaded connection has been identified.

Although the system 10 and method 50 examples as described above are used in a process of breaking-out threaded connections 22 in the tubular string 12, in other examples the x-ray unit 30 may be used to identify the threaded connections for other purposes. Furthermore, the x-ray unit 30 may be used to identify a threaded connection 22 whether the tubular string 12 is being raised, is being lowered, or is stationary.

It may now be fully appreciated that the above disclosure provides significant advancements to the art of handling tubulars used in subterranean wells. In examples described above, the x-ray unit 30 can be used to identify the threaded connection 22 in the tubular string 12, so that the torque application device 28 can apply torque to the threaded connection. The position of one or both of the threaded connection 22 and the torque application device 28 can be automatically adjusted as needed prior to the application of torque to the threaded connection.

The above disclosure provides to the art a method 50 for use with a subterranean well. In one example, the method 50 can comprise: positioning an x-ray unit 30 so that x-rays 36 emitted by the x-ray unit 30 scan a tubular string 12; displacing the tubular string 12 relative to the x-ray unit 30; and identifying a threaded connection 22 in the tubular string 12.

The identifying step may include detecting the x-rays 36 after they scanned the tubular string 12, and transmitting signals indicative of the detected x-rays 36 to an image processor 44. The identifying step may include the image processor 44 transmitting to a control system 46 an indication that the threaded connection 22 has been identified.

The method may include the control system 46 controlling operation of a lifting apparatus 42 to thereby adjust a position of the tubular string 12. The controlling step may be performed automatically in response to the identifying step.

The method may include adjusting a position of a torque application device 28 in response to the identifying step. The adjusting step may be performed automatically in response to the identifying step.

The positioning step may include positioning an x-ray emitter 38 and an x-ray detector 40 of the x-ray unit 30, so that the tubular string 12 is between the x-ray emitter 38 and the x-ray detector 40.

The positioning step may include positioning the x-ray unit 30 vertically between a rotary clamp 24 and a backup clamp 26 of a torque application device 28. The positioning step may include positioning the x-ray unit 30 between a torque application device 28 and a rig floor 18.

The above disclosure also provides to the art a system 10 for use with a subterranean well. In one example, the system 10 comprises: a torque application device 28 configured to apply torque to a threaded connection 22 in a tubular string 12, and an x-ray unit 30 configured to project x-rays 36 toward the tubular string 12.

The x-ray unit 30 may be positioned a known vertical distance relative to the torque application device 28. The x-ray unit 30 may be positioned vertically between a rotary clamp 24 and a backup clamp 26 of the torque application device 28. The x-ray unit 30 may be positioned vertically between the torque application device 28 and a rig floor 18.

The x-ray unit 30 may include an x-ray emitter 38 and an x-ray detector 40, and the tubular string 12 may be positioned between the x-ray emitter 38 and the x-ray detector 40.

The system 10 may include an image processor 44 in communication with the x-ray detector 40. The x-ray detector 40 may be configured to transmit signals to the image processor 44 indicative of x-rays 36 projected toward the tubular string 12.

The system 10 may include a control system 46 in communication with the image processor 44. The image processor 44 may be configured to transmit signals to the control system 46 in response to identification of a threaded connection 22 in the tubular string 12.

The control system 46 may be configured to control a vertical position of at least one of the tubular string 12 and the torque application device 28.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method for use with a subterranean well, the method comprising:
    positioning an x-ray unit so that x-rays emitted by the x-ray unit scan a tubular string;
    displacing the tubular string relative to the x-ray unit; and
    identifying a threaded connection between adjacent tubulars of the tubular string by detecting an internal detail of the threaded connection.

2. The method of claim 1, in which the identifying comprises detecting the x-rays after scanning the tubular string, and transmitting signals indicative of the detected x-rays to an image processor.

3. The method of claim 2, in which the identifying comprises the image processor transmitting to a control system an indication that the threaded connection has been identified.

4. The method of claim 3, further comprising the control system controlling operation of a lifting apparatus to thereby adjust a position of the tubular string.

5. The method of claim 4, in which the controlling is performed automatically in response to the identifying.

6. The method of claim 3, further comprising adjusting a position of a torque application device in response to the identifying.

7. The method of claim 6, in which the adjusting is performed automatically in response to the identifying.

8. The method of claim 1, in which the positioning comprises positioning an x-ray emitter and an x-ray detector of the x-ray unit, so that the tubular string is between the x-ray emitter and the x-ray detector.

9. The method of claim 1, in which the positioning comprises positioning the x-ray unit vertically between a rotary clamp and a backup clamp of a torque application device.

10. The method of claim 1, in which the positioning comprises positioning the x-ray unit between a torque application device and a rig floor.

11. A system for use with a subterranean well, the system comprising:
    a torque application device configured to apply torque to a threaded connection between adjacent tubulars of a tubular string; and
    an x-ray unit configured to project x-rays toward the tubular string and determine a position of the threaded connection in the tubular string by detecting an internal detail of the threaded connection.

12. The system of claim 11, in which the x-ray unit is positioned a known vertical distance relative to the torque application device.

13. The system of claim 11, in which the x-ray unit is positioned vertically between a rotary clamp and a backup clamp of the torque application device.

14. The system of claim 11, in which the x-ray unit is positioned vertically between the torque application device and a rig floor.

15. The system of claim 11, in which the x-ray unit comprises an x-ray emitter and an x-ray detector, and the tubular string is positioned between the x-ray emitter and the x-ray detector.

16. The system of claim 15, further comprising an image processor in communication with the x-ray detector.

17. The system of claim 16, in which the x-ray detector is configured to transmit signals to the image processor indicative of the x-rays projected toward the tubular string.

18. The system of claim 16, further comprising a control system in communication with the image processor.

19. The system of claim 18, in which the image processor is configured to transmit signals to the control system in response to identification of a threaded connection in the tubular string.

20. The system of claim 18, in which the control system is configured to control a vertical position of at least one of the tubular string and the torque application device.

\* \* \* \* \*